UNITED STATES PATENT OFFICE.

OLIVER KAMM AND ROGER ADAMS, OF URBANA, AND ERNEST H. VOLWILER, OF CHICAGO, ILLINOIS, ASSIGNORS TO THE ABBOTT LABORATORIES, OF CHICAGO, ILLINOIS, A CORPORATION OF ILLINOIS.

ANESTHETIC COMPOUND.

1,358,751.     Specification of Letters Patent.     Patented Nov. 16, 1920.

No Drawing.     Application filed January 23, 1920. Serial No. 353,613.

*To all whom it may concern:*

Be it known that we, OLIVER KAMM and ROGER ADAMS, residing at Urbana, in the county of Champaign and State of Illinois, and ERNEST H. VOLWILER, residing at Chicago, in the county of Cook and State of Illinois, all citizens of the United States of America, have invented certain new and useful Improvements in Anesthetic Compounds, of which the following is a specification.

Our invention relates to the production of gamma-dialkylamino-n-propyl alcohol esters of aromatic acids which possess the general formula

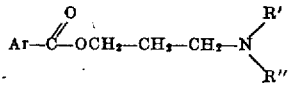

in which R' and R'' represent alkyl radicals which may be either alike or different but in any case one of which is larger than an ethyl group and in which Ar represents an aryl group. (By "aryl group" we refer to a phenyl or a substituted phenyl group).

*General method of synthesizing compounds of this series.*

Benzoyl or a substituted benzoyl chlorid is added to an equal molecular quantity of a gamma dialkylamino propyl alcohol in benzene as a solvent. The mixture is heated for a short time to insure completion of the reaction, after which the hydrochlorid of the ester is either filtered off and dissolved in water or the reaction mixture is shaken with dilute hydrochloric acid. This latter process takes into the aqueous layer the hydrochloric acid salt of the gamma-dialkylamino propyl ester of the aromatic acid. By making this aqueous solution alkaline with sodium hydroxid, the free base precipitates. It is separated and then treated with a molecular quantity of hydrochloric acid in alcohol or water and the solution obtained, evaporated to crystallization. If an amino benzoic acid derivative is desired, nitro benzoyl chlorid is used at the beginning and the aqueous solution which is obtained above by shaking with dilute hydrochloric acid is directly reduced with various reagents such as tin and hydrochloric acid and then worked up in the usual way. These compounds, either in the form of their bases or salts, possess anesthetic properties.

*Specific compounds in this series.*

A specific compound belonging to the general series as above defined is the gamma-di-n-butyl amino propyl alcohol ester of p-amino benzoic acid. It may be prepared by the general process described above. In 250 cc. of benzene, 20 g. of para-nitrobenzoyl chlorid are added gradually to 20 g. of gamma di-n-butyl amino propyl alcohol. (This alcohol has not hitherto been described in the literature. It may be obtained readily by the action of trimethylene chlorohydrin upon di-n-butyl amin and under atmospheric pressure boils at 235-240° with slight decomposition or 170° at 80 mm). To insure completion of the reaction, the mixture is heated for about an hour on the water bath after which it is shaken with dilute hydrochloric acid. The aqueous layer is separated and treated with an excess of tin and hydrochloric acid, the temperature being held during the reduction at 50° in order to prevent hydrolysis of the ester. After no more heat is evolved from the reaction, the mixture is maintained at a temperature of 50° for about one-half hour longer so as to insure complete reduction; the mixture is then diluted and the tin removed with hydrogen sulfid. The aqueous layer when made alkaline allows the gamma-di-n-butyl amino propyl alcohol ester of p-amino benzoic acid to precipitate. This is extracted with ether and upon evaporation of the solvent, the free base is obtained as an oil. This is then treated in alcohol or water with one molecule of hydrochloric acid, which allows the monohydrochlorid of the base to form. By evaporation of the solvent, a white solid is obtained which on crystallization from water, gives a melting point of 104–105° C. The product is a local anesthetic. By dissolving the free base in other acids besides hydrochloric, various salts may be obtained. For example, the hybromid, white crystals m. p. 143°. the hydrobromid, white crystals m. p. 143°.

Following the specific directions just mentioned, the following additional compounds have been prepared: gamma - di-isobutyl amino propyl alcohol ester of p-amino benzoic acid hydrochlorid, white crystals m. p. 169°, gamma-di-isoamylamino propyl alcohol ester of p-aminobenzoic acid hydrochlorid, white crystals m. p. 169–170°; gamma-di-isopropylamino propyl alcohol ester of p-aminobenzoic acid hydrochlorid, white crystals m. p. 178–179°. These compounds may also be obtained as salts of nitric, lactic, succinic, tartaric, boric acids, etc.

The gamma-dialkylamino-n-propyl alcohol esters of aromatic acids above specified are either liquid compounds or low-melting solids. They are insoluble in water but readily soluble in ether. All of these bases, as well as their salts, possess anesthetic properties. When heated with an aqueous solution of alkali, they undergo decomposition, yielding the gamma-dialkyl amino-propyl alcohols and salts of the aryl acids.

The scope of the invention should be determined by the language of the appended claims, which should be interpreted as broadly as possible consistent with the state of the art.

We claim as our invention:

1. As a new article of manufacture, a compound of the general series:

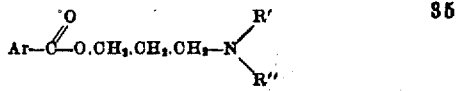

in which R' and R" represent alkyl radicals, one of which is larger than an ethyl group, and in which Ar represents an aryl group containing a benzene nucleus.

2. As a new article of manufacture, a gamma-dialkylamino propyl ester of an aromatic acid possessing the general structure:

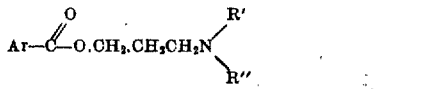

in which R' and R" represent alkyl radicals, one of which is larger than an ethyl group, and where Ar represents an aryl group containing a benzene nucleus.

3. A new article of manufacture, the gamma - di-n-butyl amino propyl ester of p-amino benzoic acid, the hydrochlorid of which is a colorless crystalline solid melting at 104–105° C. and which possesses anesthetic properties.

OLIVER KAMM.
ROGER ADAMS.
ERNEST H. VOLWILER.

Correction in Letters Patent No. 1,358,751.

It is hereby certified that in Letters Patent No. 1,358,751, granted November 16, 1920, upon the application of Oliver Kamm and Roger Adams, of Urbana, and Ernest H. Volwiler, of Chicago, Illinois, for an improvement in "Anesthetic Compounds," an error appears in the printed specification requiring correction as follows: Page 2, strike out line 2 and insert the words *the nitrate white crystals m. p. 110–112°;* and that the said Letters Patent should be read with this correction therein that the same may conform to the record of the case in the Patent Office.

Signed and sealed this 7th day of June, A. D., 1921.

[SEAL.]

KARL FENNING,
*Acting Commissioner of Patents.*

Cl. 23—24.